(12) United States Patent
Stumpf et al.

(10) Patent No.: US 6,193,456 B1
(45) Date of Patent: Feb. 27, 2001

(54) THREADED METAL INSERT

(75) Inventors: Michael Stumpf, Bielefeld; August Borchard, Lemgo; Peter Jankowski, Bielefeld, all of (DE)

(73) Assignee: Bollhoff GmbH, Bielefeld (DE)

( * ) Notice: Subject to any disclaimer, the term of this patent is extended or adjusted under 35 U.S.C. 154(b) by 0 days.

(21) Appl. No.: 09/455,581

(22) Filed: Dec. 6, 1999

(51) Int. Cl.⁷ .................................................. F16B 37/04
(52) U.S. Cl. .............................. 411/180; 411/82; 411/456
(58) Field of Search ........................... 411/82, 179, 180, 411/176, 107, 456, 451.3, 451.5

(56) References Cited

U.S. PATENT DOCUMENTS

| | | | | |
|---|---|---|---|---|
| 2,949,142 | * | 8/1960 | Sumerak | 411/180 |
| 3,403,718 | * | 10/1968 | Hughes | 411/180 |
| 4,046,181 | * | 9/1977 | Barnsdale | 411/180 |
| 4,842,462 | * | 6/1989 | Tildesley | 411/180 |
| 5,131,795 | * | 7/1992 | Kobusch | 411/180 |
| 5,391,031 | | 2/1995 | Medal | |
| 5,634,752 | * | 6/1997 | Haage | 411/82 |

FOREIGN PATENT DOCUMENTS

| | | |
|---|---|---|
| 1978882 | 1/1967 | (DE). |
| 3143855A1 | 5/1981 | (DE). |

* cited by examiner

Primary Examiner—Flemming Saether
(74) Attorney, Agent, or Firm—Seyfarth Shaw

(57) ABSTRACT

A metal insert, in particular a threaded metal insert, adapted to be embedded in a receiving bore of a plastic part. The insert has a sleeve-like body member. At least one row of teeth projects from the peripheral surface of the body member, which teeth are circumferentially spaced with respect to each other. Each tooth is of a shape such that it diverges from a tooth front end in an axial direction and terminates in an end face extending transverse to said axial direction at a tooth terminal end. Between the teeth are gaps which taper in said axial direction while they remain open between said end faces of adjacent teeth. The teeth ensure that insertion forces for urging the insert into the plastic part are minimal, while resistance to withdrawal of the insert is maximal.

12 Claims, 2 Drawing Sheets

THREADED METAL INSERT

BACKGROUND OF THE INVENTION

The present invention relates to a metal insert, in particular a threaded insert, adapted to be embedded into a receiving bore of a plastic part.

Such metal inserts generally are inserted into the receiving bore of the plastic part by pressing the insert into the plastic material softened by heat or ultrasonic energy (heat embedding, ultrasonic welding). Furthermore, it has become known to introduce the insert into the material of the plastic part by cold pressing or by injection molding. In order to prevent the insert from being withdrawn and from being rotated, the insert generally has its peripheral surface provided with surface irregularities such as undercuts, grooves, notches, indentations, toothings and the like. For example U.S. Pat. No. 4,046,181 discloses a sleeve-like insert having a peripheral surface comprising axial stepped conical portions which are provided with teeth and notches.

While such measures provide for increased resistance to withdrawal and rotation of the insert, it also increases to the insert's resistance to being inserted into the plastic part. Apparently, the requirements for maximal withdrawal and rotation resistance is somewhat in contrast to the requirements for minimal insertion resistance.

SUMMARY OF THE INVENTION

It is a general object of the present invention to provide a metal insert adapted to be embedded into a receiving bore of a plastics member, which insert possesses minimal insertion resistance and maximal withdrawal and rotation resistance.

The present invention provides a metal insert adapted to be embedded in a receiving bore of a plastic part, comprising a body member having a peripheral surface about a central axis, and at least one row of teeth projecting from said peripheral surface of the body member and being circumferentially spaced with respect to each other, each tooth being of a wedge-like shape diverging from a tooth front end in an axial direction towards a tooth terminal end, and having an end face extending at said tooth terminal end in a direction transverse to said axial direction such that there are gaps between the teeth, each gap tapering from said tooth front end in said axial direction towards said tooth terminal end while remaining open between said end surfaces of adjacent teeth.

Due to the design of the teeth provided on the peripheral surface of the body member of the insert the material of the plastic part may flow through the gaps between the teeth into the area downstream of the end faces of the teeth when the metal insert is being pressed into the plastic part. This results in a substantial decrease of the insert's resistance to being pressed into the plastic material. The area downstream of the end faces of the teeth provides for some kind of pockets which receive the plasticized plastic material so that it may expand and be cured in this area. This results in a substantial increase of the insert's withdrawal resistance. Simultaneously, the teeth radially projecting from the peripheral surface of the body member provide for a relatively high rotational resistance of the insert.

Preferably, each tooth has at its top a radially projecting, axially extending rib which substanially increases the insert's rotational resistance.

BRIEF DESCRIPTION OF THE DRAWINGS

For the purpose of facilitating an understanding of the invention, there is illustrated in the accompanying drawings a preferred embodiment thereof, from inspection of which, when considered in connection with the following description, the invention, its construction and operation, and many of its advantages should be readily understood and appreciated.

DESCRIPTION OF THE PREFERRED EMBODIMENT

Figure 1:
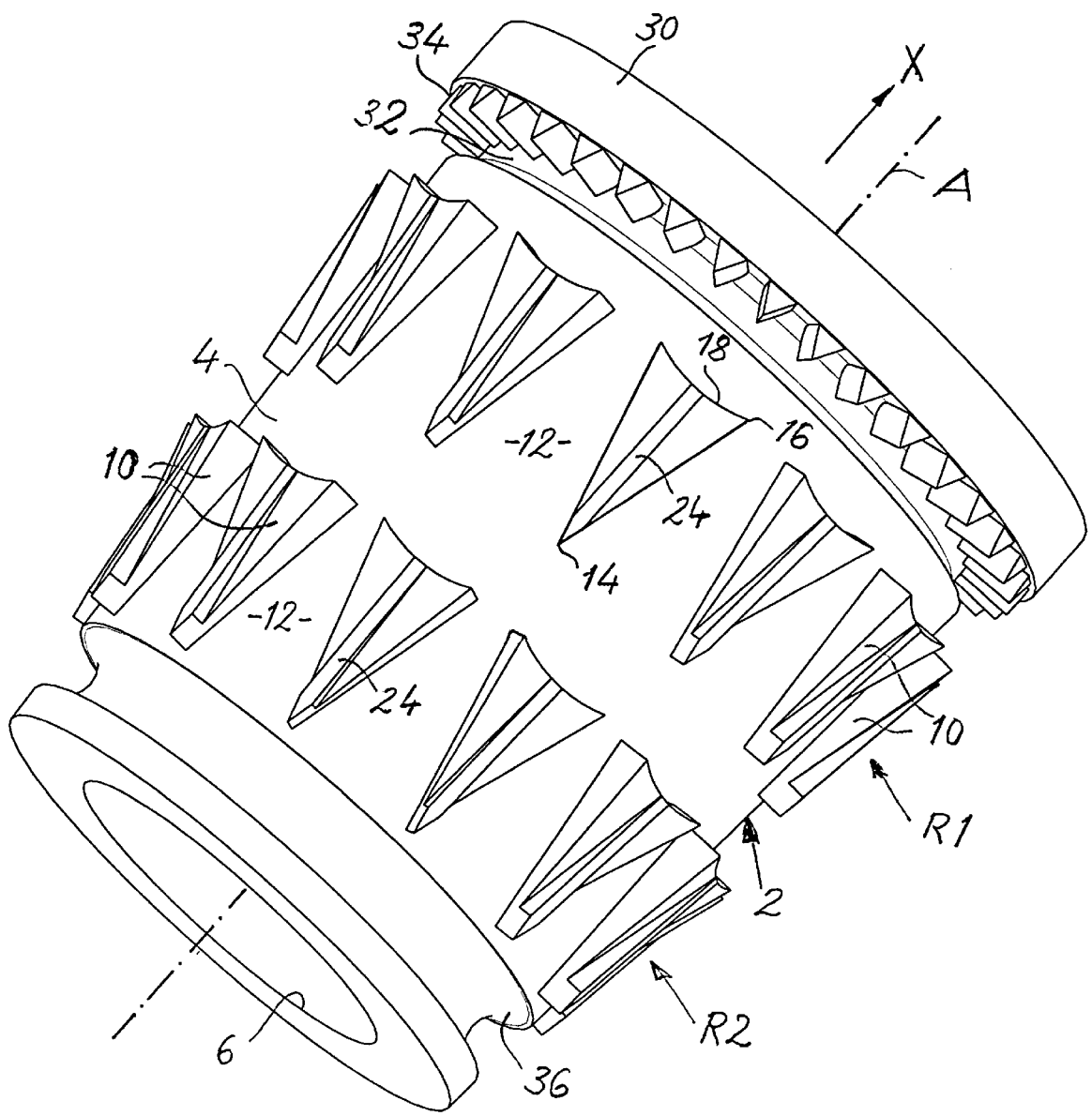
FIG. 1 is a perspective view of a metal insert.

The metal insert shown in FIG. 1 has a sleeve-like body member 2 with an external peripheral surface 4 and a central hole 6 which is concentric to an axis A and which may be designed as a thru-bore or a blind bore. Preferably, the insert is a threaded insert, i.e. the hole 6 is provided with internal threads (not shown). It is to be noted, however, that the hole 6 may be of different design, e.g. may be smooth or profiled so that the insert may be used as a spacer sleeve, a tube section, a sealing insert or the like. Depending on the intended use the hole 6 could be omitted. Furthermore, the insert could be provided with an axially projecting threaded shaft (not shown).

The metal insert is adapted to be embedded into a correspondingly dimensioned receiving bore of a plastic part (not shown). The embedding operation may be performed in a conventional manner by plastifying the plastic material by heat or ultrasonic energy (heat embedding, ultrasonic welding, electroinductive embedding). Alternatively, it would be possible to press the insert while being cold into the hole of the plastic part (cold pressing). A further possibility would be to embed the insert by injection molding while the plastic part is being manufactured by injection molding.

The insert shown in FIG. 1 will be embedded into the (not shown) plastic part such that its lefthand lower end (in FIG. 1) will be positioned within the plastic part while the righthand upper end (in FIG. 1) will be positioned on the outside thereof. Therefore, the axial direction indicated by the arrow X in FIG. 1 will be designated as "withdrawal direction" in the following description because it is this direction in which the withdrawal forces act as a result of respective loading of the insert.

As is shown in FIG. 1 the peripheral surface 4 of the body member 2 is provided with two rows R1 and R2 of teeth 10. It is to be understood that there may be more than two or, if desired, only one row of teeth 10. The teeth 10 of each row R1 and R2 are circumferentially spaced from each other such that the teeth 10 of row R1 are circumferentially offset with respect to the teeth 10 of row R2.

As a result of the spacing of the teeth 10 there are gaps 12 between the teeth 10. Each tooth 10 is of a shape such that its width increases from the tooth front end 14 in the withdrawal direction X towards the tooth terminal end 16 such that the gaps 12 taper correspondingly in the withdrawal direction X. The spacing between the teeth 10 is selected such that the gaps 12 remain open even at their most narrows areas between the tooth terminal ends 16 of adjacent teeth 10. The purpose of this design will be explained in more detail below.

Figure 2:
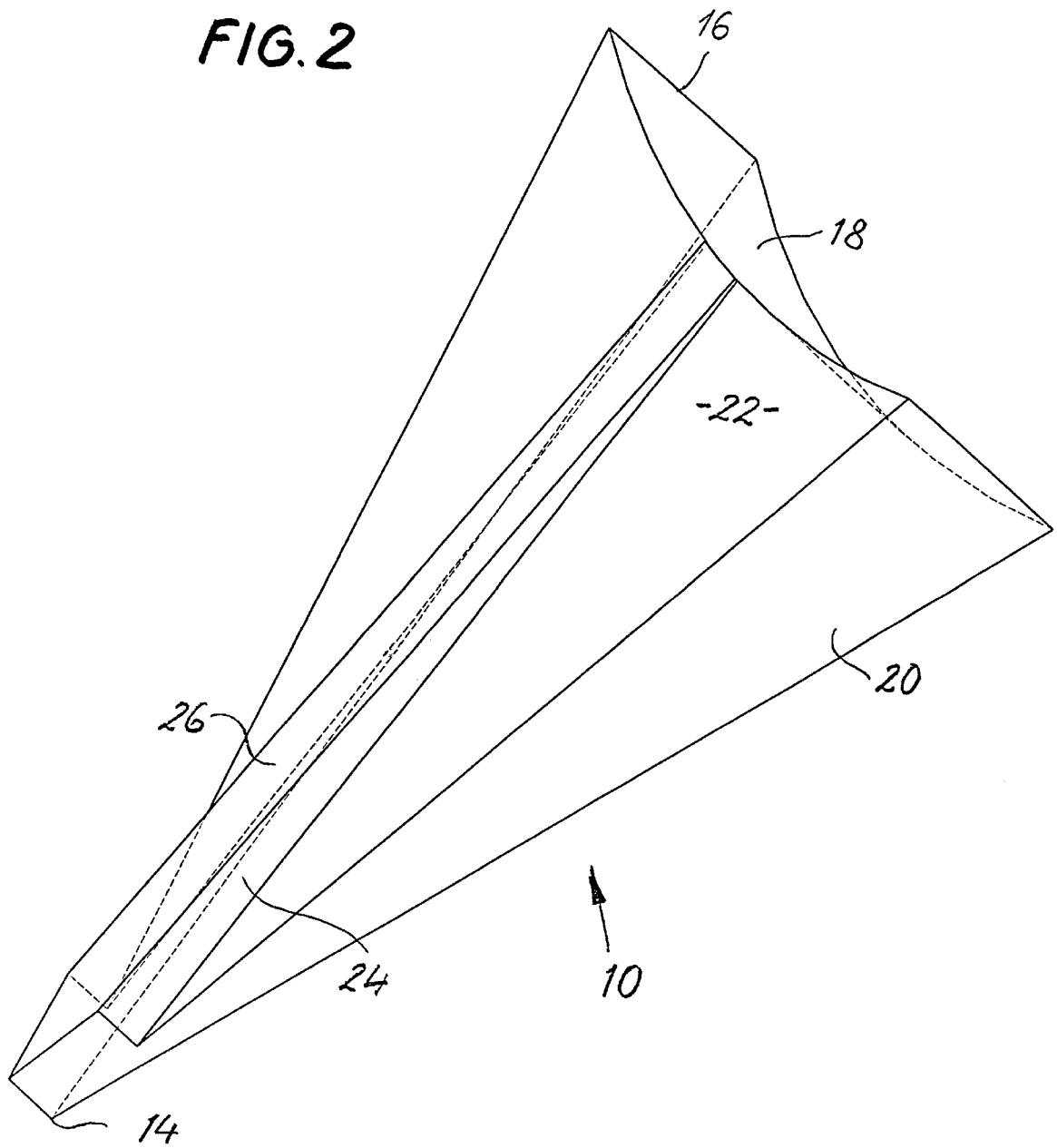
FIG. 2 is a perspective detailed view of a tooth of the insert shown in FIG. 1.

As may be seen from FIG. 1 and in particular FIG. 2, the base surface of each tooth 10 is substantially in the shape of an isosceles triangle; each tooth 10 is defined by a pair of side faces 20 and an end face 18, each of which extends transversely to the peripheral surface 4 of the body member 2. The side faces 20 include, at the front end 14 of each tooth, an acute angle which preferably is between 30° and 60°. The softer the material of the plastic part is, the larger should be this angle. As is clearly shown in the figures, the end face 18 of each tooth 10 is of concave arcuate shape for a purpose which will be explained below.

Each tooth 10 has a radially projecting, axially extending rib 24 at its top surface 22 remote from the peripheral surface 4 of the body member 2. The rib 24 may be considered to be generated by recesses in the top surface 22 of the tooth 10 on both sides of rib 24. In the embodiment as shown the design is such that the radial thickness of each tooth 10 increases in the withdrawal direction X, and the radial thickness of the associated rib 24 decreases in the withdrawal direction X. At the front end of the tooth the rib 24 is of the same angular shape as the tooth 10 itself. The "ridge", i.e. the top surface 26 of the rib 24, is of planar shape in the embodiment as shown. Depending on the material of the plastic part receiving the insert the top surface 26 may be of a different shape; it may be provided for example with teeth, a groove, a different inclination or the like.

As may be seen in FIG. 1, the peripheral surface 4 of the body member 2 is of conical shape. Preferably, the cone angle is in the order of 8°. This facilitates embedding of the insert into the plastic part. Furthermore, the mating conical shape of the hole of the plastic part enables the plastic part to be removed from the mold when the plastic part is manufactured by injection molding.

The body member 2 has at its upper righthand end in FIG. 1 (the "withdrawal end") an annular flange 30 which is the upper terminal end of the insert inserted into the plastic part. As may be seen, an annular groove 32 is provided between the annular flange 30 and the peripheral surface 4. Furthermore, the annular flange 30 has teeth 34 at its axial face facing away from the withdrawal end. Preferably, the hole 6 is provided, in the area of the annular flange 30, with a conical chamfer (not shown) which may facilitate the mounting of a bolt (not shown) into a threaded insert and may help to prevent the internal threads from being damaged when the insert is embedded into the plastics member by ultrasonic energy.

Adjacent the opposite end of the insert there is provided an annular groove 36 of arcuate cross-section.

In the following, the operation of embedding the described insert into a plastic part and the condition of the embedded insert will be described. When the insert is pressed into the receiving hole of the (not shown) plastic part in a direction opposite to the withdrawal direction X—preferably under the influence of heat—, the teeth 10 with their narrow ribs 24 extending in the axial direction readily penetrate into the plastified material due to their acute angular shape. The plastifted material of the plastic part will flow through the gaps 12 in the withdrawal direction X. Since the gaps 12 even at their most narrow areas between the tooth terminal ends 16 are open, the plastified material will flow into the area downstream of the teeth 10 where pocket-like reservoirs formed by the arcuate end faces 18 of the teeth receive the displaced plastified material. The ribs 24 help to guide the plastified plastic material into the pocket-like reservoirs. Simultaneously, the plastified material flows into the annular groove 36 which may be provided with teeth (not shown) in order to facilitate upwards movement of the plastified material. Furthermore, the plastified material flows into the annular groove 32 and into the gaps between the teeth 34.

Due to the described shape and arrangement of the teeth 10 with their ribs 24, the annular groove 36 and the annular groove 32 with the teeth 34 only relatively small pressing forces are required to press the insert into the plastic part.

On the other hand, when the insert has been embedded in the thermosetted plastic material of the plastic part, the insert will possess a high resistance both to withdrawal and rotation thereof due to the design as described above: The end faces 18 of the teeth 10 define, as described, pocket-like reservoirs which collect plastic material flowing through the gaps 12. This prevents the insert from being axially withdrawn from the plastic part (in the withdrawal direction X). The arcuate shape of the end faces 18—rather than planar end faces—provide for a substantially increased withdrawal resistance which is increased further by the annular grooves 36 and 32. The annular flange 30 which prevents plastic material from flowing out of the receiving hole of the plastic part compresses the plastified material in the reservoirs downstream of the end faces 18 of the teeth 10 which also results in an increase of the withdrawal resistance.

A high resistance of the insert to rotational movements results on the one hand from the side faces 20 of the teeth 10 and on the other hand from the ribs 24. As is shown in the figures the teeth 10 and the ribs 24 are of a shape such that their total surfaces facing circumferentially provide for a high resistance of the insert to circumferential loadings of the insert. The total surfaces of the teeth 10 and the ribs 24 facing circumferentially may increase towards the tooth terminal ends 16 so that the insert's resistance to rotation will be maximal there. Furthermore, the teeth 34 provided at the annular flange 30 provide for an additional increase of the insert's resistance to rotation.

As may readily appreciated by skilled persons most of the advantages as described are present also in an insert which is embedded into the plastic part by "cold pressing" or by injection molding of plastic material about the insert when the plastic part is manufactured by injection molding.

What we claim is:

1. A metal insert adapted to be embedded in a receiving bore of a plastic part, comprising a body member having a peripheral surface about a central axis, and a least one row of teeth projecting from said peripheral surface of the body member and being circumferentially spaced with respect to each other, each tooth being of a wedge-like shape diverging from a tooth front end in an axial direction towards a tooth terminal end, and each tooth having side faces extending transverse to said peripheral surface of said body member and intersecting at said tooth front end under an acute angle, and an end face extending transverse to said peripheral surface of said body member and being of slightly concave arcuate shape such that there are gaps between the teeth, each gap tapering from said tooth front end in said axial direction towards said tooth terminal end while remaining open between said end faces of adjacent teeth.

2. The metal insert of claim 1, wherein each tooth has a base surface in the shape of an isosceles triangle.

3. The metal insert of claim 1 wherein an axially extending rib radially projects from a radially outer top surface of each tooth.

4. The metal insert of claim 3 wherein the rib of each tooth is of the same angular shape as the tooth at said tooth front end.

5. The metal insert of claim 3 wherein each tooth has a radial thickness which increases in said axial direction and each rib has a radial thickness which decreases in said axial direction.

6. The metal insert of claim 1 which includes two or more axially spaced rows of teeth, the teeth of one row being circumferentially offset with respect to the teeth of an adjacent row.

7. The metal insert of claim 1 wherein said peripheral surface of said body member is of conical shape.

8. The metal insert of claim 1 wherein said body member has an annular flange at a first axial end thereof.

9. The metal insert of claim 8 wherein said annular flange has teeth at a radial face facing away from said first axial end.

10. The metal insert of claim 8 wherein said body member has an annular groove at a second axial end thereof.

11. The metal insert of claim 1 wherein said body member has a central hole which is a thru-bore or a blind bore.

12. The insert of claim 11 wherein said body member is provided with internal threads.

* * * * *